(No Model.) 8 Sheets—Sheet 1.

A. G. MEEZE.
APPARATUS FOR MEASURING AND CONTINUOUSLY REGISTERING PHYSICAL POWER.

No. 336,337. Patented Feb. 16, 1886.

Fig. 1.

Attest:
John A. Ellis
A. B. Moore

Inventor:
Arthur George Meeze
By David A. Burr
Atty.

(No Model.) 8 Sheets—Sheet 3.

A. G. MEEZE.
APPARATUS FOR MEASURING AND CONTINUOUSLY REGISTERING PHYSICAL POWER.

No. 336,337. Patented Feb. 16, 1886.

(No Model.) 8 Sheets—Sheet 7.
A. G. MEEZE.
APPARATUS FOR MEASURING AND CONTINUOUSLY REGISTERING PHYSICAL POWER.
No. 336,337. Patented Feb. 16, 1886.

(No Model.) 8 Sheets—Sheet 8.

A. G. MEEZE.
APPARATUS FOR MEASURING AND CONTINUOUSLY REGISTERING PHYSICAL POWER.

No. 336,337. Patented Feb. 16, 1886.

Attest:
John A. Ellis
A. B. Moore

Inventor:
Arthur George Meeze
By David A. Burr
Atty.

United States Patent Office.

ARTHUR GEORGE MEEZE, OF REDHILL, COUNTY OF SURREY, ENGLAND.

APPARATUS FOR MEASURING AND CONTINUOUSLY REGISTERING PHYSICAL POWER.

SPECIFICATION forming part of Letters Patent No. 336,337, dated February 16, 1886.

Application filed July 30, 1885. Serial No. 173,115. (No model.) Patented in England December 29, 1883, No. 5,909; in France June 27, 1884, No. 162,999, and in Belgium April 5, 1885, No. 68,407.

*To all whom it may concern:*

Be it known that I, ARTHUR G. MEEZE, of Redhill, in the county of Surrey, England, have invented a new and useful Improvement in Apparatus for Measuring and Continuously Registering Physical Power; and I do hereby declare that the following is a full and exact description thereof, reference being had to the accompanying drawings, and to the letters of reference marked thereon, making a part of this specification, the same having been made the subject of Letters Patent in England, No. 5,909, of December 29, 1883; in France, No. 162,999, of June 27, 1884, and in Belgium, No. 68,407, of April 5, 1885.

My invention relates to improved apparatus for measuring and registering physical power, whereby I achieve results of great utility and economic value—such, for example, as the measurement of meterage of the power given out by steam, gas, water, hot-air, or other engines worked by fluid-pressure, the power transmitted through revolving shafting or communicated by driving-belts from one revolving shaft to another, the quantity of electrical energy passed through an electrical conductor, the power exerted by winds or other fluids in motion, and thence, indirectly, the quantity of such fluid passed through pipes or other conduits.

In the accompanying drawings.

The same letters indicate the same parts in all the figures.

Figure 1:
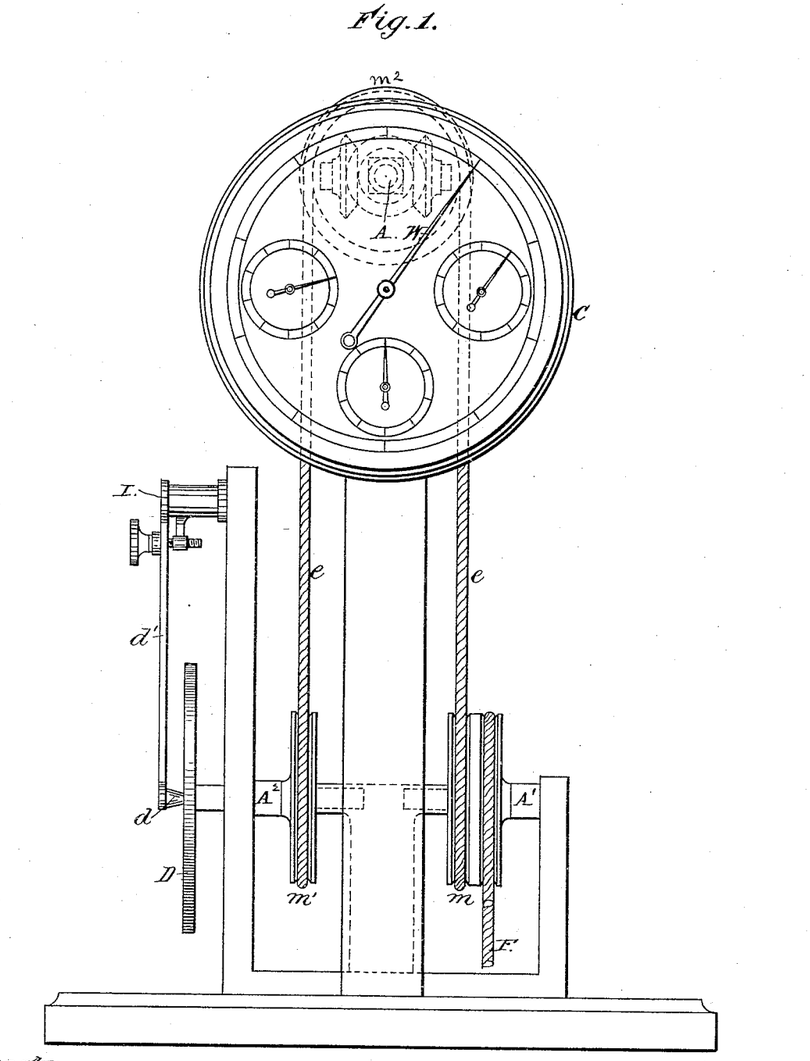
Figure 1 is a front, and Fig. 2 a side, elevation of my integrating mechanism in simple form.

The construction and arrangement of my improved dynamometrical apparatus, which I designate as an "ergometer," and in which I effect mechanically the integration of the functions of an electrical machine or of a flowing current and register the product continuously upon a dial, are as follows:

I mount a shaft or spindle, A, so as to turn freely in suitable bearings, and connect one end of it by a cog-wheel or other suitable means with a counting device of the customary form, consisting of a train of decimal wheels and a dial-plate, C, whereon and whereby the number of revolutions or parts of a revolution of the said spindle are registered in the usual manner. Upon this spindle A, I mount two equal bevel-faced pinions or cog-wheels, $i\ i'$, (see Figs. 2, 3, 4, 6, and 8,) to turn loosely thereon and gear with two counterpart interposed bevel-faced pinions or cog-wheels, $j\ j$, rotating upon stud-axles made fast to the spindle at a right angle thereto and opposite to each other, the whole constituting a differential gear, as illustrated in the drawings. To the outer side of each bevel-pinion $i\ i'$ a grooved pulley, $m^2$ and $m^3$, is secured (see Figs. 1, 2, and 3) to rotate loosely therewith upon the spindle A, and these pulleys are preferably roughened or lined with wood, india-rubber, or other suitable material, for the purpose of insuring the proper grip of the bands or belts by which they are driven.

On another part of this same machine I mount in suitable bearings two secondary axles or spindles, A' A², at right angles to the spindle A, and parallel with the stud-axles of the pinions $j\ j$, and upon each I secure a pulley or grooved wheel, $m$ and $m'$, counterparts of the pulleys $m^2$ and $m^3$. The pulleys $m$, $m'$, $m^2$, and $m^3$ are all placed in mechanical communication by means of a continuous driving-belt, $e$, of suitable elastic extensile material. By preference I use a belt made of metallic wire wound into a long spiral spring and united at the ends by suitable connections.

By means of the above-described arrangement of pulleys and differential gear the power applied by a driving-belt F, (see Figs. 1 and 2,) or other motor to the spindle A' is transmitted to the opposite spindle, A², by the elastic belt $e$, diverted over the pulleys in manner as set forth, and as clearly shown in the drawings. When thus arranged, both spindles A' A² move at equal speeds so long as A² is doing no work, and the upper band-pulleys, $m^2$ $m^3$, and their bevel-pinions $i$ $i'$ will rotate at equal speeds in opposite directions, causing the interposed pair of bevel-pinions $jj$ to rotate idly on their stud-axles, which are fast on the shaft A, so that the indicating-needle W, Fig. 1, will remain at rest upon the dial C of the counter. If, however, a resistance is brought to bear upon the spindle A², and it is caused to do work, and a change in the relative velocity of the two spindles A' and A² ensues, there will result a difference in tension between the two sides of the band $e$, passing around the driving-pulley $m$, and the upper pulley, $m^2$, will be driven faster than the opposite pulley, $m^3$. When this occurs, the pinions $jj$ will creep round the pinions $i$ $i'$, and will cause the shaft A of the counting device to turn, thereby moving the needle W over the dial C.

Upon the end of the secondary spindle A² I mount a flat circular disk, D, (see Figs. 1, 2, 3, and 4,) or cone as its equivalent. Against the face of this disk or its equivalent cone I cause to be pressed a movable friction-piece, $d$. The pressure of the friction-piece $d$ is capable of adjustment by means of a flexible arm or spring, $d'$, and normally the friction-piece is kept pressed against the disk at its center, or at the apex of the cone when the latter is used instead of the disk, but is arranged so as to be free to move uniformly over its surface away from the center, (see dotted line, Fig. 3,) the arm $d'$ being pivoted upon a stud-axle, I, to permit this movement.

The meterage of electrical energy derived from an electric motor, K, may be effected by connecting the arm $d'$ of the friction-piece $d$ with a beam, J, (see Fig. 3,) free to oscillate upon the stud-axle I. From one arm of this beam J, I suspend a movable core, L, and from the other a counterpoise, $j^2$, which counterpoise may, if desired, be replaced by a suitable spring. The core is composed of an upper and a lower section of fine insulated German-silver or other conducting wire wound in opposite directions, and forming a shunt-circuit of high resistance, connecting the points on the main circuit between which the electrical energy expended is to be measured. This core may or may not, as desired, form one continuous circuit with the high-resistance armature of the electric motor K, which drives the ergometer. The main current or a fraction three of passes through the field-magnet of the motor, and also through a stationary solenoid, L', composed of an outer and an inner coil, $l$ and $l'$, (see Fig. 3,) of large insulated conducting wire, wound in the same direction. To intensify the action of the solenoid L', the coils may be wound in and on soft-iron cylinders, as shown. The movable core L, being suspended in or between the coils of the stationary solenoid L', as shown in the drawings, is displaced more or less, according as the electrical energy of the circuit varies, thus causing the friction-piece $d$ of the integrator to move over the face of the friction-disk D, and so vary the amount of work done through and registered by the integrator. Instead of the above-described electric motor, I may use clock-work to drive the one pulley of the integrator uniformly, which clock-work may be driven or controlled electrically in many known ways. I however prefer to use the electric motor as described, and by a relatively great increase in the pressure of the friction-piece $d$ to place the said motor under the control of the variable brake-power exercised by the friction-piece upon the integrator-disk D, which arrangement, it will be perceived, is identical in principle with the previously-described methods of using the integrator, though the effect produced is of a somewhat more complicated character. It is of course obvious that the solenoid L' may be replaced by many well-known and equivalent devices.

Figure 2:
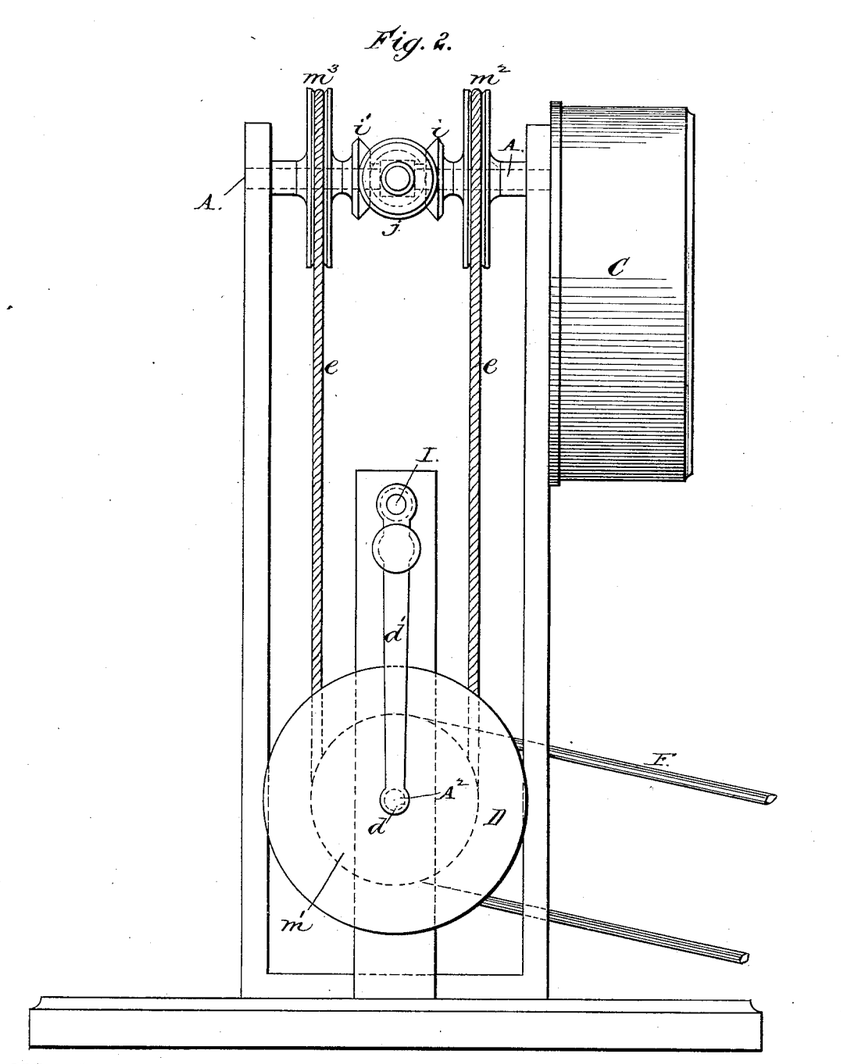
Figure 3:
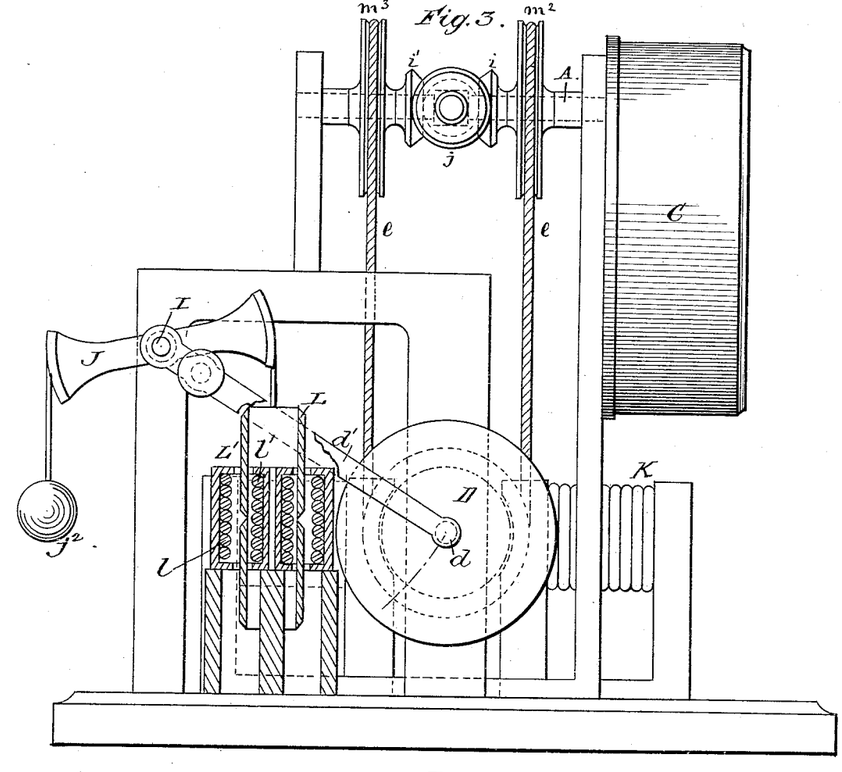
Fig. 3, a sectional elevation of the apparatus when constructed as an "ergometer," to measure work done by an electrical current—*i. e.*, the meterage of electrical energy—Fig. 4 being a plan view thereof.
Figure 4:
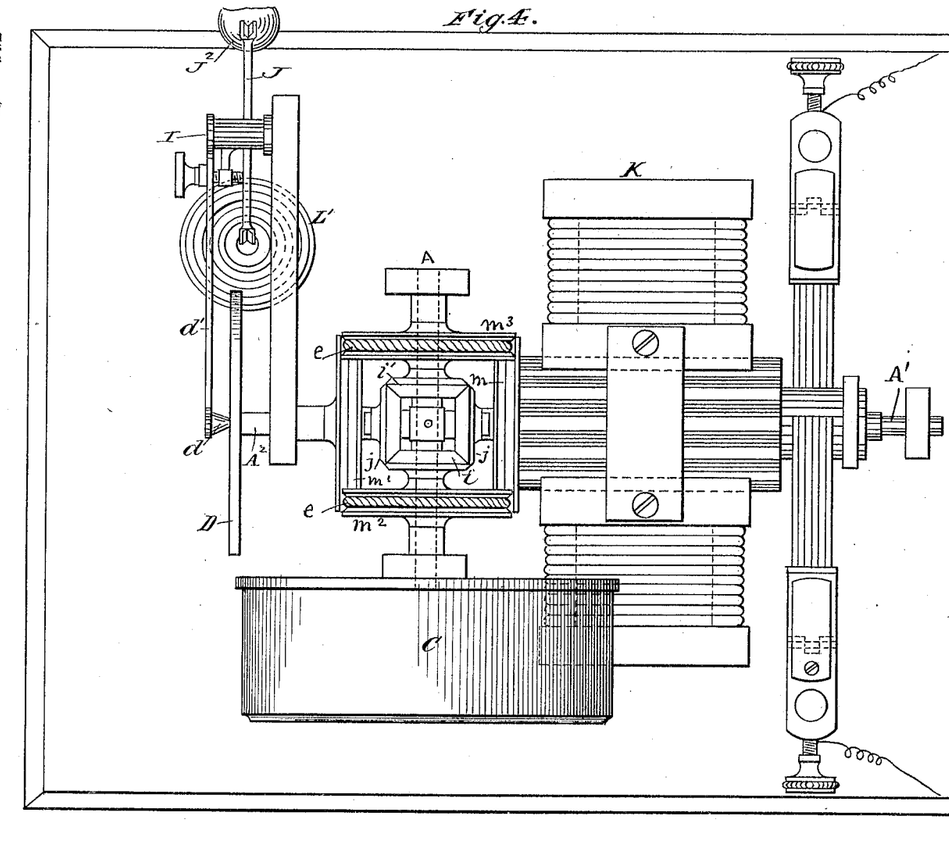
Figure 5:
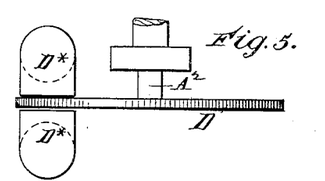
Fig. 5, a diagram illustrating a modification of the same, in which the energy is measured by the resistance of a disk revolving between the poles of an electro-magnet.
Figure 6:
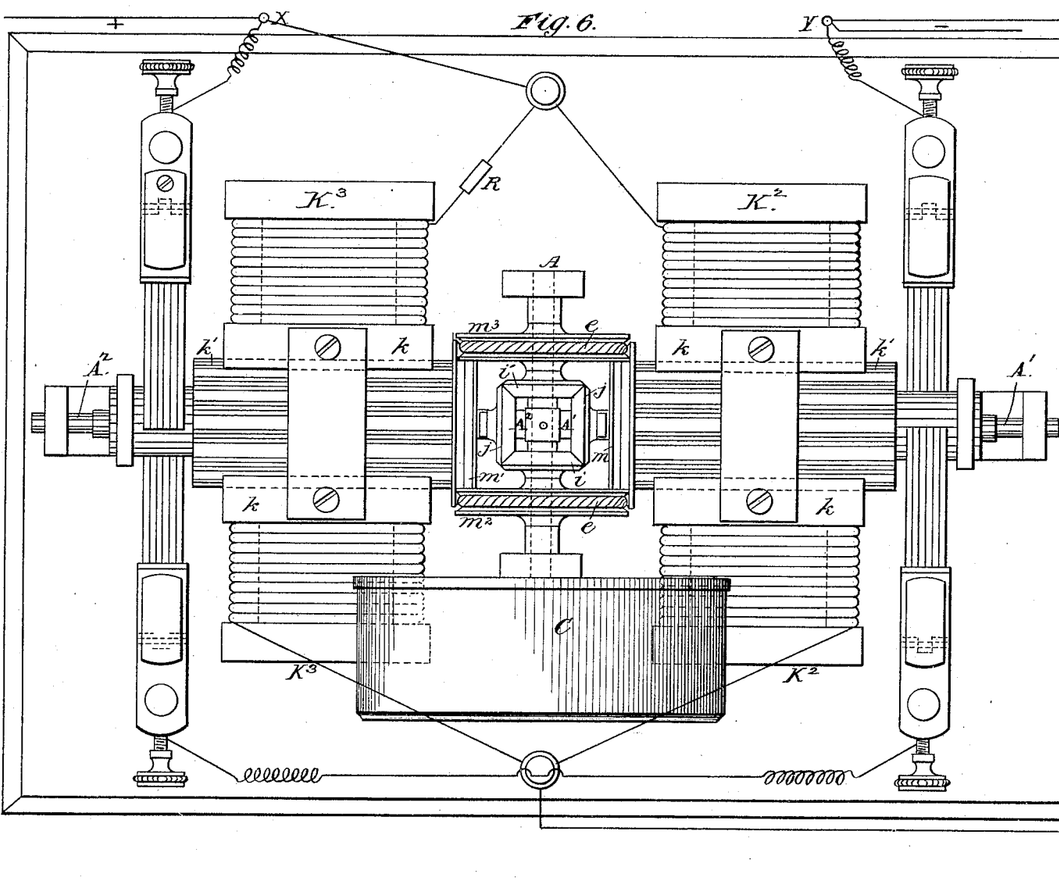
Fig. 6 is a plan view, and Fig. 7 an elevation, respectively, of the ergometer when adapted to the meterage of the electric energy expended between any two points of a conductor by means of the difference in velocity between the tight and loose sides of an elastic driving-belt.

I contemplate modifying the arrangement as shown in Figs. 2 and 3, by causing the secondary axle A² of the integrator, with or without the disk attachment D and its friction-piece $d$, to do work in other ways, as in overcoming a resistance introduced by moving a conductor through a magnetic field such that the work done shall be proportional to the electrical energy to be measured. Thus I may replace the friction-disk D by a metallic disk, D', Fig. 5, revolving between the poles D* D* of an electro-magnet around which the main current or a known fraction thereof passes; or I may couple the one spindle, A', (see Fig. 6,) with the axle of an electric motor, K², and the other spindle, A², with the axle of a second electric motor, K³, as shown in Figs. 6 and 7. In this latter arrangement I cause one of these electric motors, K², to do work through the integrator upon the other, K³, which work varies more or less with the energy of the electrical current passing in the circuit. In some cases one of the motors may be driven by the other entirely as a dynamo-machine; but in general it is best for the motors to be arranged to act differentially, so that one does work upon the other at some convenient rate. When I use the combination shown in Figs. 6 and 7, I cause the main current or a known fraction thereof to divide into two portions, one part of which passes round the field-magnet of the one motor—say K²—and the other part round the field-magnet of the other motor—say K³. These portions of the main current then unite and continue as before their temporary division. By introducing an electrical resistance, R, in a well-known way into either of these branch circuits the power of the field-magnets, and therefore of the motors K² K³, may be fixed in any convenient ratio. The high-resistance armatures may either form one continuous shunt-circuit between the points X and Y, between which the electrical energy is to be measured, or be worked independently. By suitably adjusting the directions and the relative resistance in the two branches of the main current round the field-magnets they may be arranged so that neither motor does work upon the other. By altering this ratio one may be made to do work upon the other at a rate fixed as regards the instrument, but varying more or less with the energy of the current which is thus measured and registered.

In the operation of my ergometer, when the resistances are so adjusted that neither motor does work on the other, the needle W of the counting device C will remain at rest; but when one motor—say $K^2$ (see Figs. 6 and 7)—is caused to do work on the other, $K^3$, the band passing from the pulley $m$ to the pulley $m'$ over the pulley $m^2$ will be tightened, and will move faster than that portion passing from the pulley $m'$ to the pulley $m$ over the pulley $m^3$. The pulley $m^3$ and its pinion $i'$ will therefore move more slowly than the pulley $m^2$ and pinion $i$, and the latter pinion will cause the pinions $j\ j$, whose stud-axles are fast on the spindle A, to creep round the pinion $i'$ as a fulcrum, and will cause a rotation of the said spindle and a corresponding continuous deflection of the needle of the counter C, so long as the motor $K^2$ is doing work upon the motor $K^3$.

For metering the power exerted by winds or other fluids in motion, I replace one or both of the electric motors, as described above, by a suitable fluid motor or motors—as, for example, by the cups of the ordinary anemometer. These I may make of different powers, and cause one to do work upon the other; or I may substitute for one of these motors the friction-disk D, described above, and regulate the position of the friction-piece $d$ on the disk by the pressure of the fluid on a vane controlled by a spring.

Figure 8:
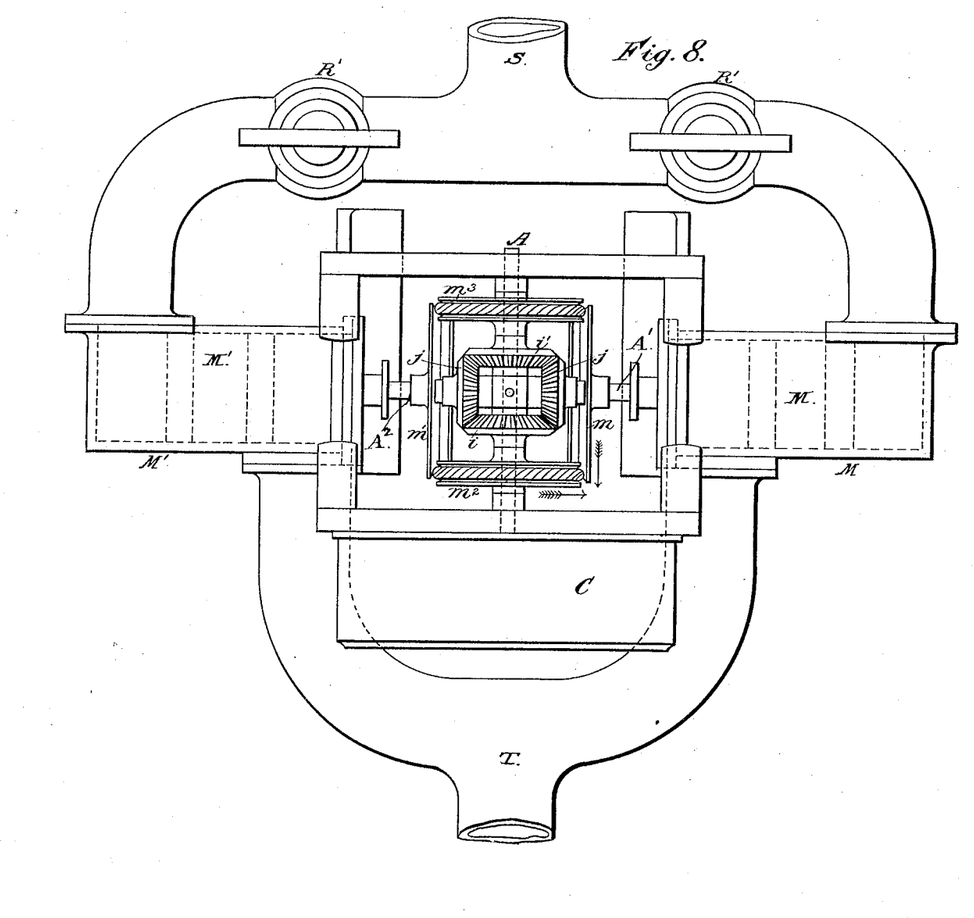
Figs. 8 and 9 illustrate the apparatus as applied to the meterage of water.
Figure 9:
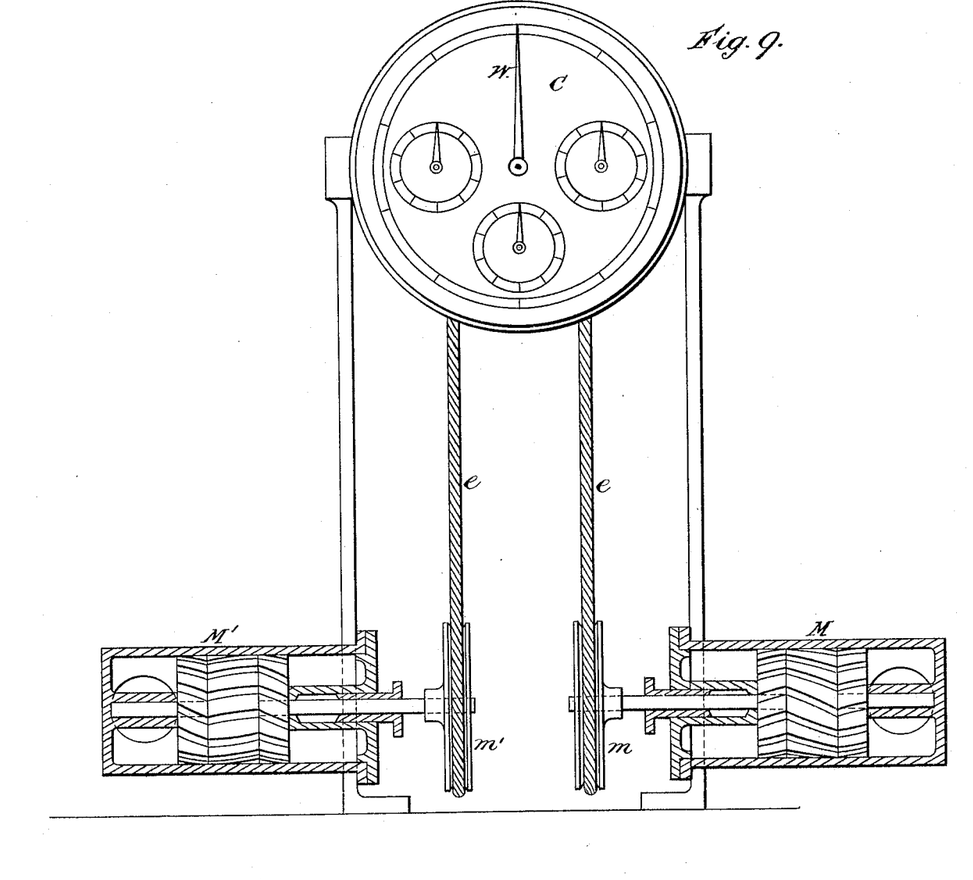

For measuring the quantity of a fluid passed through pipes or other conduits, I cause the main supply-pipe to divide into two branches of different diameters, or control the passage of the fluid by cocks in such a manner that more of the fluid shall flow through one branch than through the other. These branches may again unite. In each branch I place a motor driven by the fluid in passing, and connect them so that one of these motors shall do work upon the other, and thus in the manner above described for electricity I measure the quantity of fluid passed through the pipe. This arrangement is illustrated in Figs. 8 and 9.

M M' are the two fluid-motor engines, of any suitable construction. The stream of water to be measured is diverted into two branches— say between the points S and T—and each branch is caused to drive a motor. These motors are connected to the shaft of the counting mechanism by a single continuous elastic extensible belt, $e$, in the manner clearly shown in the drawings, differential gearing similar to that already shown and described with reference to Figs. 6 and 7 being interposed between the two motors. Thus arranged, if both motors move at equal speeds, the upper band-pulleys, $m^2\ m^3$, and their bevel-pinions $i\ i'$ will rotate at equal speeds in opposite directions, causing the other pair of bevel-pinions, $j\ j$, to rotate idly on their stud-axles, which are fast on the shaft A. If, however, the velocity of the two motors is made to vary in a given ratio, which may be easily effected by adjusting a cock or cocks, R'R', Fig. 8, in the branch pipes, and the motor M is caused to do work on the motor M', there will result a difference in tension between the two sides of the band $e$ passing around the fast driving-pulley $m$, and the upper pulley, $m^2$, will be driven faster than the opposite pulley, $m^3$. When this occurs, the pinions $j\ j$ will creep round the pinion $i'$, and will cause the shaft A of the counting device to turn, thereby moving the needle W over the dial C. Thus indirectly through the work done I measure the quantity of liquid passed.

I claim as my invention—

1. The dynamical integrating device hereinabove described, comprising a spindle, A, an indicating and counting device, C, geared thereto, a differential gear, $i\ i'\ j\ j$, and pulleys $m^2\ m^3$, mounted upon said spindle, a main driving shaft or spindle, A', a pulley, $m$, fitted thereon, a secondary shaft or spindle, $A^2$, a pulley, $m'$, thereon, and a single elastic extensile belt, $e$, carried over the pulleys $m\ m'$ and diverted over the pulleys $m^2$ and $m^3$, all substantially in the manner and for the purpose herein set forth.

2. The combination, with two independent shafts, A' and $A^2$, geared the one, A', to a prime motor, and the other, $A^2$, to the machinery to be driven, and with the shaft or spindle A, and an indicating and counting device, C, mounted thereon at right angles to said shafts A' and $A^2$, of pulleys $m$ and $m'$, secured, respectively, to the shafts A' and $A^2$, loose pulleys $m^2$ and $m^3$, revolving upon the spindle A, and bevel-pinions $i\ i'$, revolving upon stud-axles projecting from said spindle A at diametrically-opposite points and geared to said loose pulleys $m^2$ and $m^3$, and an endless elastic extensile belt, $e$, led over the pulleys $m$, $m'$, $m^2$, and $m^3$, all substantially in the manner and for the purpose herein set forth.

3. The combination, with a counting device, C, and a spindle, A, geared thereto, and with a differential gear, $i\ i'\ j\ j$, and pulleys $m^2\ m^3$, mounted upon said spindle, a driving shaft or spindle, A', a pulley, $m$, fitted thereon, a secondary spindle, $A^2$, a pulley, $m'$, thereon, and a single elastic extensile belt, $e$, carried over the pulleys $m$, $m'$, $m^2$, and $m^3$, of a friction disk or cone, D, carried by the secondary spindle $A^2$, and a spring-actuated friction-piece, $d$, moving to and from the center of the disk or cone, so as to retard and control the velocity of the secondary spindle, substantially in the manner and for the purpose herein set forth.

4. The combination, with a counting device, C, a spindle, A, geared thereto, a differential gear, $i\ i'\ j\ j$, and pulleys $m^2\ m^3$, mounted upon said spindle, a driving shaft or spindle, A', an electromotor to drive said shaft A', a pulley, $m$, fitted on the shaft, a secondary spindle, $A^2$, a pulley, $m'$, thereon, a single elastic extensile belt, $e$, carried over the pulleys $m$, $m'$, $m^2$, and $m^3$, a friction disk or cone, D, carried by the secondary spindle $A^2$, and a spring-actuated friction-piece, $d$, moving to and from the center of the disk or cone, so as to retard and control the velocity of the secondary spindle, of an electric motor, K, actuating the shaft A, a movable core, L, playing within the coils of a solenoid, L', through which a portion of the electric current is carried, a counterbalanced pivoted beam, J, from which said core L is suspended, and an arm, $d'$, carrying the friction-piece $d$ and coupled to the beam J, so that the movement of the core shall cause the friction-piece to move, all substantially in the manner and for the purpose herein set forth.

In testimony whereof I have signed my name to this specification in the presence of two subscribing witnesses.

ARTHUR GEORGE MEEZE.

Witnesses:
ARTHUR N. MCLELLAN,
GEORGE P. SKELSEY,
*Both of No. 50 Gresham House, London, E. C.,
Notary's Clerks.*